United States Patent [19]

Uchiyama

[11] Patent Number: 5,244,620

[45] Date of Patent: * Sep. 14, 1993

[54] MOLD FORMING METHOD

[75] Inventor: Koichi Uchiyama, Ushiku, Japan

[73] Assignee: Riso Kagaku Corporation, Tokyo, Japan

[*] Notice: The portion of the term of this patent subsequent to Mar. 19, 2008 has been disclaimed.

[21] Appl. No.: 692,388

[22] Filed: Apr. 30, 1991

[30] Foreign Application Priority Data

May 19, 1990 [JP] Japan .................................. 2-118656

[51] Int. Cl.$^5$ .................................................. B29C 33/40
[52] U.S. Cl. ...................................... 264/220; 264/225; 427/282
[58] Field of Search ............... 264/219, 220, 225, 257, 264/294, 308; 427/265, 272, 282

[56] References Cited

U.S. PATENT DOCUMENTS

| 2,651,079 | 9/1953 | Michaelson et al. | 264/219 |
| 2,659,171 | 11/1953 | Hill | 427/282 |
| 2,779,269 | 1/1957 | Hill | 427/282 |
| 3,267,191 | 8/1966 | Williams et al. | 264/219 |
| 3,914,368 | 10/1975 | Harkness | 264/219 |
| 4,324,815 | 4/1982 | Mitani et al. | 427/282 |
| 4,547,406 | 10/1985 | Armstrong | 427/282 |
| 4,595,543 | 6/1986 | Williams | 264/219 |
| 4,668,521 | 5/1987 | Newsteder | 264/219 |
| 5,000,089 | 3/1991 | Uchiyama | 101/129 |

Primary Examiner—Jay H. Woo
Assistant Examiner—R. B. Davis
Attorney, Agent, or Firm—Kanesaka and Takeuchi

[57] ABSTRACT

A mold forming method includes steps of preparing a master having pores corresponding to an original image, holding the master under a predetermined tension, applying a mold forming material to the master, and hardening the mold forming material to produce a mold having an image corresponding to the original.

1 Claim, 6 Drawing Sheets

MOLD FORMING METHOD

BACKGROUND OF THE INVENTION

1. Field of the Invention

This invention relates to a method for forming a mold by applying the principle of mimeographing printing, and to a mold which is formed by this method.

2. Prior Art of the Invention

Heretofore a mold has been made by using a prototype which is carved according to an original image and is reproduced on a mold forming material in reversed form.

With the conventional method, it is expensive to prepare an original mold by carving. It has been considered too difficult to prepare a variety of molds in relatively small quantity.

SUMMARY OF THE INVENTION

It is therefore an object of this invention to provide a method for forming a mold by using a technique of preparing a mimeographic plate according to printed matters or manuscript, so that the mold can be prepared in a short period of time and at a reduced cost.

According to a first aspect of the invention, there is provided a mold forming method comprising: preparing a mimeographic plate having pores therein corresponding to an original image; holding the mimeographic plate in the air under a predetermined tension; applying a mold forming material forcibly on one side of the mimeographic plate, the mold forming material having fluidity at least when applied to the mimeographic plate so that the mold forming material, when forcibly applied to the mimeographic plate, passes through the pores, the mold forming material passing through the pores adhering to the mimeographic plate on a side opposite to the side that the mold forming material is applied; and hardening the mold forming material adhered to the mimeographic plate to thereby provide a mold corresponding to the original image on the plate.

With this arrangement, a surface of the mold may be coated with a resinous material.

According to a second aspect of the invention, there is provided a mold forming method comprising: preparing a mimeographic plate having pores therein corresponding to an original image; placing a mesh sheet over one side of the mimeographic plate after the mimeographic plate with pores is prepared; holding the mimeographic plate and the mesh sheet in the air under a predetermined tension; applying a mold forming material forcibly on the other side of the mimeographic plate, the mold forming material having fluidity at least when applied to the mimeographic plate so that the mold forming material, when forcibly applied to the mimeographic plate, passes through the pores, the mold forming material passing through the pores adhering to the mesh sheet; removing the mimeographic plate from the mesh sheet after the mold forming material is applied to the mimeographic plate; hardening the mold forming material adhering to the mesh sheet; applying a different mold forming material forcibly on the mesh sheet so that different picture forming material passes through portions of the mesh sheet where the hardened mold forming material is not formed; and hardening the different mold forming material adhered to the mesh sheet to thereby provide a mold corresponding to the original image of the mimeographic plate.

With the second arrangement, a plurality of mimeographic plates different in original images of pores is prepared by repeating such steps as placing the mesh sheet, holding the mimeographic plates and the mesh sheets, applying a molding forming material, removing the mimeographic plate, and hardening the mold forming material.

According to a third aspect of the invention, there is proposed a mold forming method comprising: preparing a mimeographic plate having pores therein corresponding to an original image; placing a substrate over the mimeographic plate, the substrate allowing a mold forming material to pass therethrough when forcibly applied thereto; holding the mimeographic plate and the substrate in the air under a predetermined tension; applying the mold forming material forcibly onto the mimeographic plate, the mold forming material having fluidity at least when applied to the mimeographic plate so that the mold forming material when forcibly applied to the mimeographic plate, passes through the pores, the mold forming material passing through the pores adhering to the substrate; removing the mimeographic plate from the substrate before hardening the mold forming material on the substrate; hardening the mold forming material on the substrate; applying a different mold forming material on the substrate so that the different mold forming material passes through portions of the substrate where the hardened mold forming material is not formed; and hardening the different mold forming material adhered to the substrate.

According to a fourth aspect of the invention there is provided a mold which is formed by a method comprising: preparing a mimeographic plate having pores therein corresponding to an original image; holding the mimeographic plate in the air under a predetermined tension; applying a mold forming material forcibly on one side of the mimeographic plate, the mold forming material having fluidity at least when applied to the mimeographic plate so that the mold forming material, when forcibly applied to the mimeographic plate, passes through the pores, the mold forming material passing through the pores adhering to the mimeographic plate on a side opposite to the side that the mold forming material is applied; and hardening the mold forming material adhered to the mimeographic plate to thereby provide a mold corresponding to the original image on the plate.

DETAILED DESCRIPTION

A first embodiment of this invention will be described with reference to FIGS. 1 to 5 in the accompanying drawings.

A mimeographic plate 1 (referred to as a master hereinafter) includes a heat-sensitive film 2 for carrying an original image, and a porous screen (mesh sheet) 3 for supporting the heat-sensitive film 2, both of which are bonded.

Firstly, the master 1 is made porous according to an original image by using a thermal head, or by superimposing an original image on the heat-sensitive film 2 and irradiating light beams from the side of the mesh sheet 3.

Figure 1:
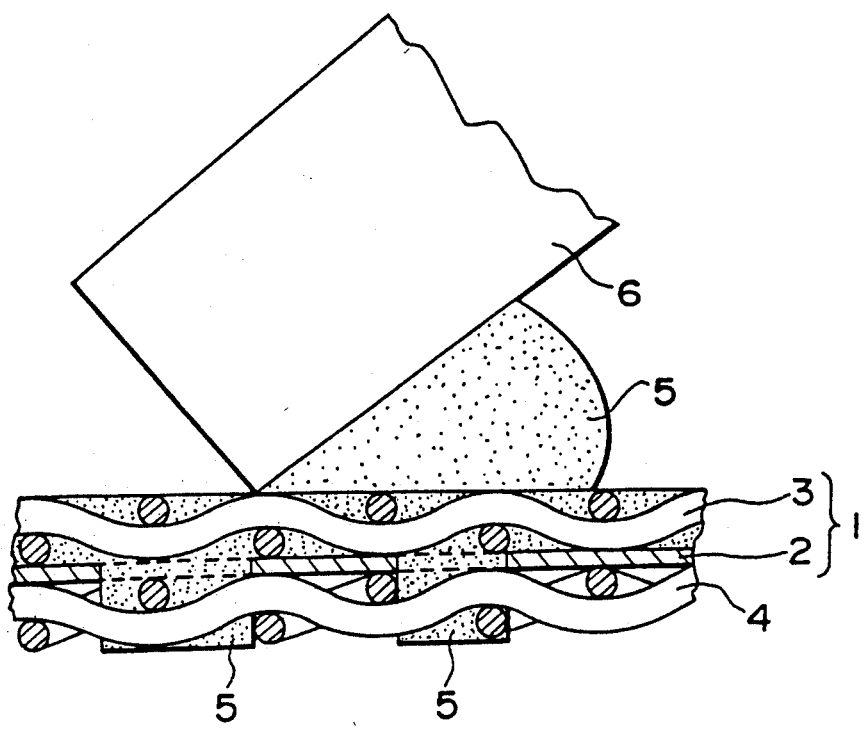
FIGS. 1, 2 and 3 are sectional views showing processes for making a mold according to a first embodiment of the invention.

As shown in FIG. 1, the prepared master 1 is superimposed on a grid screen 4 with the heat-sensitive film 2 facing the grid screen 4. The superimposed master 1 and grid screen 4 are placed on a nonillustrated frame (for a screen printing) with a predetermined tension so that the contact area of these members do not deviate each other. Both of the master 1 and the grid screen 4 are kept free on the frame. In addition, the superimposed master 1 and the grid screen 4 can be attached on a rotary drum of a rotary screen printing machine.

A mold forming material 5 is applied on the mesh sheet 3, and is squeezed by a squeegee 6 toward the grid screen 4 through the pores of the master 1 as shown in FIG. 1. The mold forming material 5 is filled in the grid screen 4 according to the pattern of the original image on the master 1. The mold forming material 5 becomes fluid under a predetermined condition, and is a moisture-hardening type silicone resin in this embodiment, for example.

Figure 2:
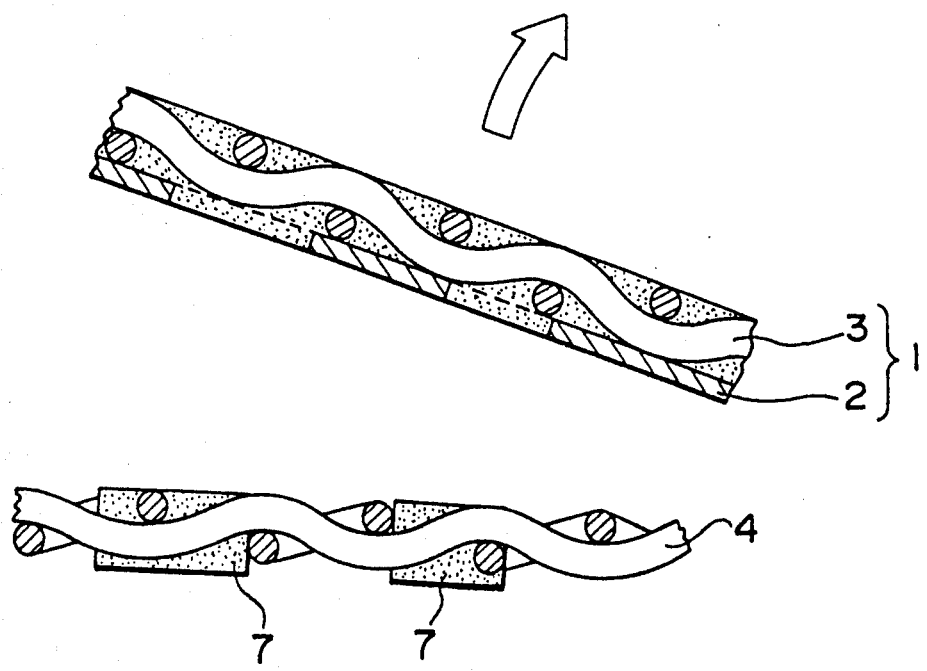
Figure 3:
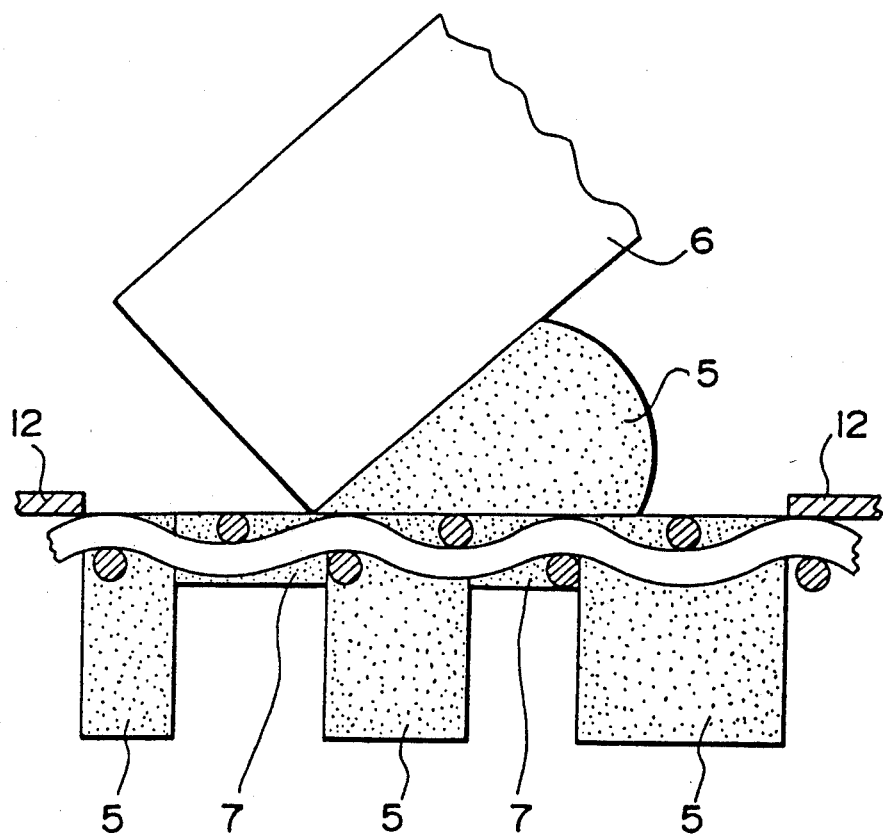

The master 1 is separated from the grid screen 4 as shown in FIG. 2. Then the mold forming material 5 held on the grid screen 4 is hardened, thereby forming block portions 7 which correspond to the original image.

Next, the grid screen 4 having the block portions 7 formed thereon is held under a predetermined tension. Non-image areas of the grid screen 4 are masked by a tape 12, if necessary. The mold forming material 5 is applied to one side of the grid screen 4, and is moved to the other side of the grid screen 4 by the squeegee 6. The mold forming material 5 is extruded around the block portions 7 corresponding to the original image. Under this condition, the mold forming material 5 is hardened so as to have an image incised according to the original image.

The term "harden" referred to here means that the mold forming material 5 remains elastic but not plastic when an external force is applied during use.

The silicone mold thus formed is easily released. Therefore a number of copies can be produced by using a variety of resinous materials. In addition, the surface of the mold has a texture of the grid screen 4, to provide a touch of cloth. On the contrary, when the mold should have a smooth surface, a little amount of a very fluid silicone material is applied to the surface of the mold.

Figure 4:
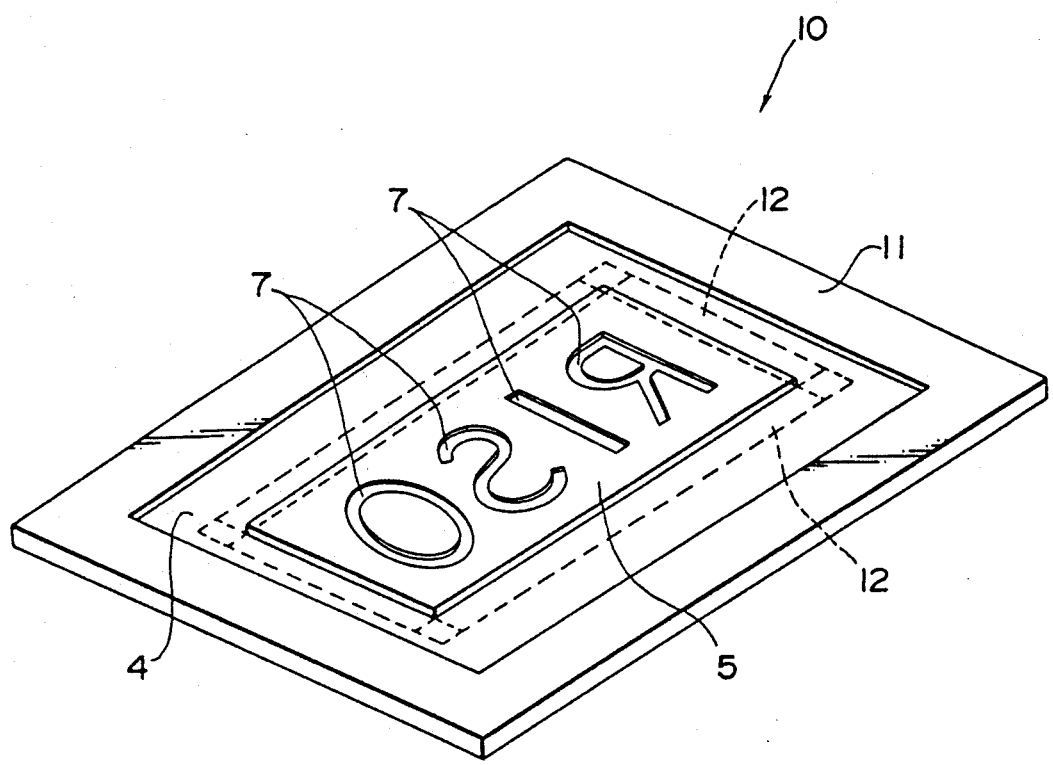
FIG. 4 is a perspective view of a mold prepared according to the first embodiment.

FIG. 4 is a perspective view of a mold 10 which was formed as described above. Reversed letters "RISO" are incised on the grid screen 4 held on the frame 11.

The master prepared according to an original "RISO" is superimposed on the grid screen 4 which is held on the frame 11. The mold forming material 5 is squeezed onto the grid screen 4, and is hardened. The block portions 7 corresponding to the letters "RISO" in erect shape are formed on the grid screen 4. The tape 12 is applied along the peripheral edge of the grid screen 4 from a side where the letters formed by the block portions 7 can be seen normal. Then the mold forming material 5 is squeezed onto the grid screen 4 from the same side. The mold forming material 5 is applied until it becomes thicker than the block portions 7. Thus the letters "RISO" are formed in reversed shape as shown in FIG. 4.

Then epoxy resin, urethane resin or a metal having low melting point is poured to the mold supported on the frame 11, thereby producing a resin plate having a normal image "RISO" projecting from the surface.

The mold forming material 5 should be fluid enough to pass through the pores on the master 1 and the grid screen 4 between the block portions 7. Further the material 5 should remain shaped stably after it is extruded and hardened. To satisfy these requirements, thixotropic resins such as silicone rubber are conceivable which have fluidity at least when applied forces. When a mold is made of a moisture-hardening silicone rubber, the mold becomes hard stably by absorbing moisture in the air, thereby reproducing an original image accurately. Otherwise, when a mold is made of a steam-setting silicone resin or a modified silicone resin, the mold may be immersed in hot water or be steamed so as to promote hardening. In the foregoing embodiment, a steam-hardening silicone was used which was adjusted to take 50 minutes to harden, about 10 minutes as a touch-free period, about 5 minutes as a usable period, and 15 minutes to harden in hot water.

Figure 5:
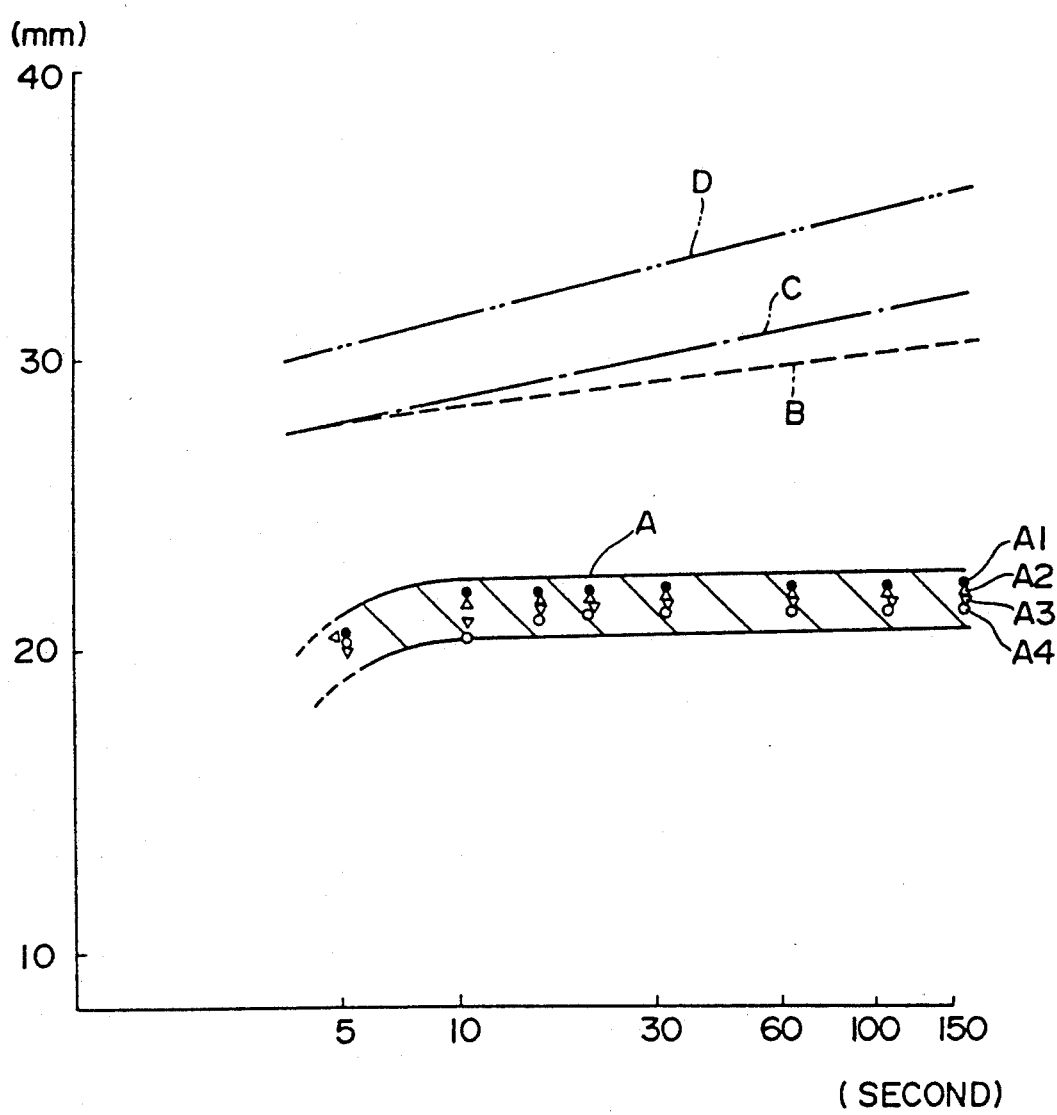
FIG. 5 is a graph showing hardness of mold forming materials.

FIG. 5 is a graph showing hardness of resinous materials A as a mold forming material. The hardness was measured by a spread meter before hardening of the materials A, and when they were caused to pass through pores on the master and the grid screen between the block portions 7. The axis of ordinate represents a diameter (mm) of the materials which were squeezed and widened, while the axis of abscissa represents time (sec).

As can be seen from FIG. 5, the respective materials A1 to A4 become stable in about ten seconds. These materials are optimum as a mold forming material to embody the present invention. For reference, lines C and D in FIG. 5 show hardness of two types of mimeographic ink which are usually used for mimeographic printing machines.

The mold forming materials A1 to A4 to be used for this invention are adjusted to have hardness of 19 to 24 as a one-minute value of the spread meter. The hardness should be preferably between 20 and 22. These materials are harder and less fluid than ordinary types of mimeographic ink. These materials do not flow after they pass through the master 1 and the grid screen 4, and maintain their shape by their own viscosity. To facilitate operation of the squeegee, the mold forming materials should have low viscosity and high structural viscosity.

In the first embodiment, the master 1 is made porous by a thermal head, for example. In addition, a porous film or a thin porous sheet may be used which can pass the mold forming material therethrough.

According to the first embodiment, the master 1 is used to form block portions 7 on the grid screen 4. However when a plurality of masters 1 having pores corresponding to different original images is superimposed and processed as described above, a mold having a complicated image can be produced.

Figure 6:
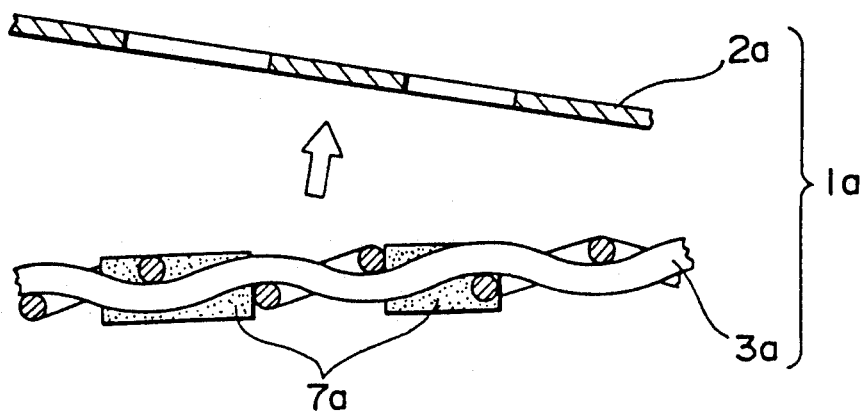
FIGS. 6 and 7 are sectional views showing processes for making a mold according to a second embodiment of the invention.
Figure 7:
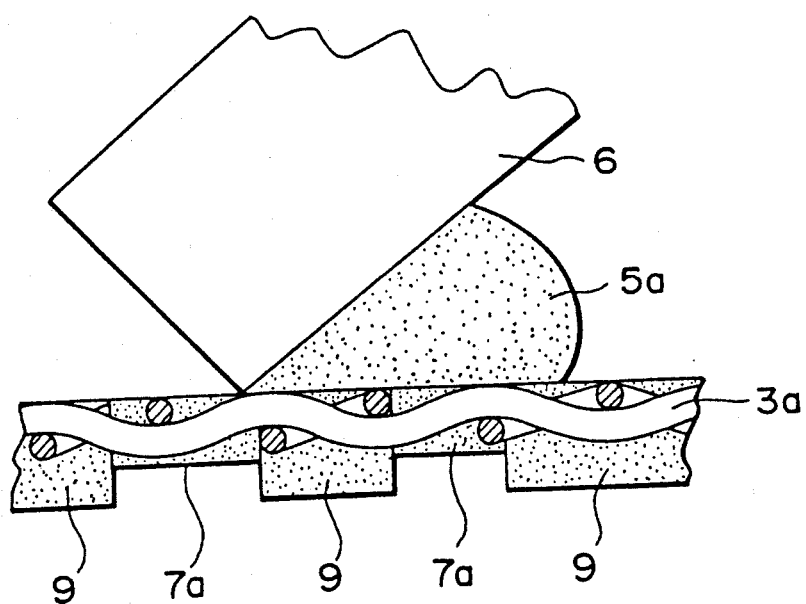
Figure 8:
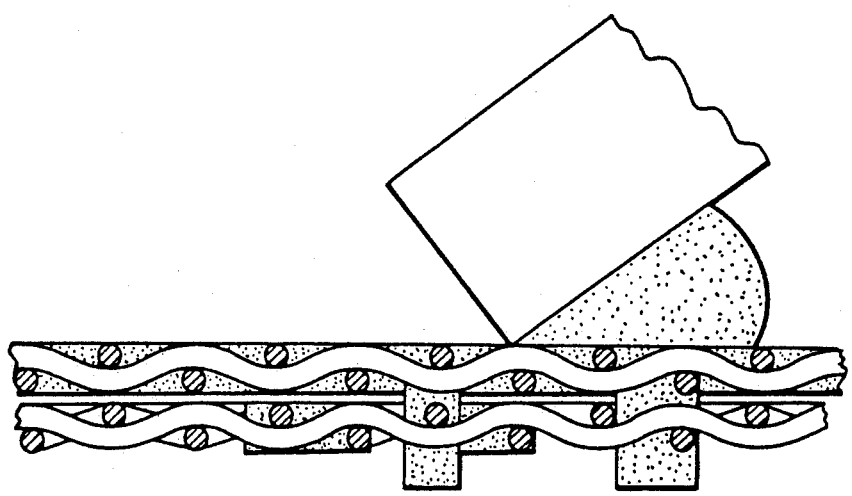
FIGS. 8 and 9 show processes for making a mold in a modified first embodiment.
Figure 9:
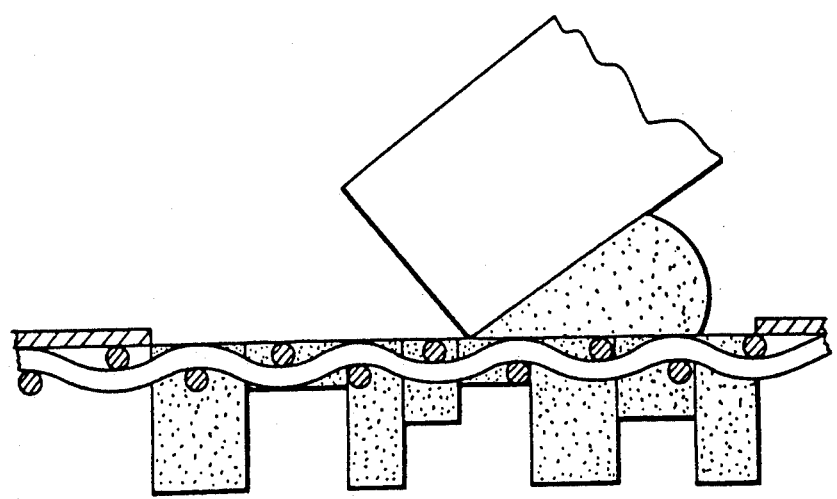

A second embodiment of this invention will now be described with reference to FIGS. 6 and 7.

A master 1a includes a heat-sensitive film 2a and a mesh sheet 3a, both of which are easily separated. As shown in FIG. 6, a moisture-hardening type silicone resin is used as a mold forming material 5a. The mold forming material is hardened so as to form block portions 7a corresponding to an ordinal image. Then the heat-sensitive film 2a is separated from the mesh sheet 3a. Another mold forming material 5a is applied on the screen 3a, and is squeezed to form projecting portions 9 around the block portions 7a.

In this embodiment, the heat-sensitive film 2a and the mesh sheet 3a may be bonded by a water-soluble adhesive so that they can be separated easily with hot water. In this case, the mold is entirely immersed in hot water after the block portions 7a are formed and hardened.

According to this invention, the mold is formed by using the mold forming material which is squeezed through the pores made on the master according to the original image and is then hardened. Therefore the mold can be made easily, at a low cost and in a short period of time. This mold forming method is suitable to make inscriptions on trophies and shields, personal emblems, various displays, models for personal use, for example.

Silicon resinous materials are safe as the mold forming material, and are applicable to making molds for foods such as chocolate, jelly, or sweets. In addition, very unique and original candles may be made by making the incised portions of the mold cylindrical and pouring wax into such portions.

What is claimed is:

1. A mold forming method comprising:
   (a) preparing a mimeographic plate having pores therein corresponding to an original image;
   (b) holding the mimeographic plate in the air under a predetermined tension;
   (c) applying a mold forming material forcibly on one side of the mimeographic plate, said mold forming material having fluidity at least when applied to the mimeographic plate so that the mold forming material, when forcibly applied to the mimeographic plate, passes through the pores, said mold forming material passing through the pores adhering to the mimeographic plate on a side opposite to the side that the mold forming material is applied;
   (d) hardening the mold forming material adhered to the mimeographic plate to thereby provide a mold corresponding to the original image on the plate; and
   (e) coating a surface of the mold with a resinous material.

* * * * *